United States Patent [19]

Hashimoto

[11] Patent Number: 4,480,279
[45] Date of Patent: Oct. 30, 1984

[54] MAGNETIC DISK MEMORY TRACK CHANGE SERVO

[75] Inventor: Yasuichi Hashimoto, Oume, Japan

[73] Assignee: Tokyo Shibaura Denki Kabushiki Kaisha, Kawasaki, Japan

[21] Appl. No.: 361,248

[22] Filed: Mar. 24, 1982

[30] Foreign Application Priority Data

May 15, 1981 [JP] Japan ............................ 56-72262

[51] Int. Cl.³ .................... G11B 5/55; G11B 21/08
[52] U.S. Cl. .................................. 360/78; 318/561; 318/616
[58] Field of Search ............... 360/77, 78; 318/561, 318/569, 600, 601, 603, 604, 609, 610, 611, 616, 617, 632, 637, 638

[56] References Cited

U.S. PATENT DOCUMENTS 4,068,269 1/1978 Commander et al. ............ 360/78
4,237,502 12/1980 Erickson et al. ................ 360/78

Primary Examiner—George G. Stellar
Attorney, Agent, or Firm—Oblon, Fisher, Spivak, McClelland & Maier

[57] ABSTRACT

A disk control circuit for a magnetic disk apparatus including a magnetic disk for storing data, a carriage for supporting a first magnetic head for reading data and a second magnetic head for reading servo data while undergoing radial movement with respect to the disc, a motor for driving the carriage, a motor driving circuit for driving the motor, a converter circuit for converting servo data to a position signal, to a speed signal, and to a track pulse, a processor for generating target speed information and track offset information, a servo control register for storing the track speed information and the track offset information, a digital to analog converter for converting the track information to an analog signal, signal selector means for selectively generating motor control signals based on predetermined combinations of the speed signal, the position signal and the analog signal produced by the digital to analog converter, and a motor drive controller for generating and applying motor drive control signals to the motor driving circuit in response to the motor control signals.

2 Claims, 7 Drawing Figures

MAGNETIC DISK MEMORY TRACK CHANGE SERVO

BACKGROUND OF THE INVENTION

1. Field of the Invention

This invention relates to magnetic disk apparatus, and more particularly to a new and improved magnetic disk control circuit.

2. Description of the Prior Art

A magnetic disk apparatus of the prior art is shown in FIG. 1. Disposed on a carriage 1 is a servo head 2 and a read/write head (not shown) to read and write data. A voice coil 3 drives the carriage 1 to transfer the servo head 2 and the read/write head. A preamplifier 4 amplifies servo data detected by the servo head 2 and provides the servo data for a transducer 8. A position formation circuit 5 sample-holds the servo data and outputs a position signal, indicating the position of the head, to a signal line 18. A track pulse formation circuit 7 forms a track pulse and outputs it to a signal line 19 to detect the level of the position signal. The formation of the track pulse is explained in more detail hereinafter. In FIG. 2, the position signal formation circuit 5 outputs the position signal (A) to transfer the servo head (T) on the magnetic disk (M) in the direction of the arrows. When the level of the position signal (A) is 0, the servo head (T) is positioned at the center data track (not shown). A track pulse B will be obtained each time the servo head crosses a data track, by a predetermined amount, which is detected when the level of the position signal A is either higher than the upper limit H or below the lower limit L. At no other time is a track pulse formed. A speed detecting circuit 6 includes a differential circuit which differentiates the position signal with respect to time in order to detect the transferring speed of the head and then to output a speed signal to a signal line 20 indicating the speed of the head at that time. A controller 9 controls positioning of the head. When the controller 9 accepts a command to transfer the head from a magnetic disk control device (not shown), it calculates the number of tracks from the present position of the head to the target track, and sets the calculated number into a down counter 10. The down counter 10 counts down every time it receives a track pulse. Therefore, the down counter 10 always stores the number of tracks remaining between the track that the head is presently crossing and the target track in responding to a head transfer command.

A D-A converter 11 converts the count numbers, namely data for the number of tracks remaining until the target track is reached, into analog signals proportional to the number of tracks remaining. A distance-speed converter 13 is provided for the analog signals. Generally, there is a predetermined functional relation $v=K\sqrt{l}$ between the distance to the target track and the transfer speed of the head, in which the distance value is converted into a speed value wherein v is the transfer speed of the head, l is the number of tracks remaining until the target track is reached which is equal to the distance, and k is a constant. Therefore, the distance-speed converter 13 converts the level l of the analog signal provided by the D-A converter 11 into the level v of the target speed signal of the head and outputs it to a signal line 21 connected to one input of an analog different circuit 14. The target speed signal thereby indicates the instantaneous target transfer speed of the head. The difference circuit 14 has a second input connected to the speed signal from the speed detector 6 which corresponds to the actual speed of the head. The difference circuit 14 detects the voltage difference between the head target speed and the head actual speed and outputs the result to a power amplifier 17 via a signal selector circuit 16. The power amplifier 17 provides the voice coil 3 with a current corresponding to the voltage difference as an accelerating/decelerating signal and controls the transferring speed of the carriage 1.

When the head reaches the target track in a manner as explained above, the down counter 10 is decremented to 0 by the track pulse. At that time, a zero detector 12 outputs a zero detecting signal via the output line 22 to the controller 9 signalling that the head has reached the target track. The signal selecter 16 is a gating circuit controlled by a control signal applied to a control input thereof from the controller 9 through the line 23. The controller 9 determines whether the position signal (A) at the output of the circuit 5 or the difference signal at the output of the difference circuit 14 will be effective in controlling the transfer speed of the carriage 1.

Most magnetic disk apparata generally have a track offset scheme to intentionally offset the position of the head to compensate for uses when the head misses or fails to stop at the proper track for various reasons. The offset voltage formation circuit 15 controlled by the control line 24 outputs a predetermined offset voltage to a signal line 25. The offset scheme adds the offset voltage to the position signal.

It is apparent that the above described prior art magnetic disk apparatus has a complicated structure to determine the target speed of the head by performing the function $v=K\sqrt{l}$ at the distant-speed converter. The prior art structure is further complicated by the necessity for the down counter, the zero detecter and the offset voltage formation circuit.

Reference is made to U.S. Pat. No. 4,068,269 and U.S. Pat. No. 4,237,502 for further background information, including circuit diagrams and flow charts, in the prior art.

SUMMARY OF THE INVENTION

It is accordingly a principal object of the invention to provide a new and improved disk control circuit for a magnetic disk apparatus having a simplified design.

It is another object of the invention to provide a new and improved disk control circuit for a magnetic disk apparatus having a more flexible implementation for the distance speed converter circuit and the track offset control circuit to drive the head.

It is still another object of the invention to provide a new and improved disk control circuit for a magnetic disk apparatus having a more flexible scheme for the track offset control portion to drive the head, especially suitable for a magnetic disk drive apparatus using a spring to return the carrage to a predetermined position when the power source is cut off.

These and other objects are achieved according to the invention by providing a new and improved magnetic disk apparatus includes a magnetic disk which has one surface on which servo data is written, a first magnetic head to read and write data from and to the magnetic disk, a second magnetic head to read the servo data, a carriage on which the first head and second head are disposed, a motor to transfer the position of the carriage, a motor driving circuit to drive the motor and move the carriage, a convertor circuit for converting the servo data read out from the second head into a position signal to indicate the position of the first head relative to the magnetic disk, for generating a speed signal to indicate the speed of the first head, and for generating a track pulse to indicate whenever the first head has passed over a track of the disk, a data processor for outputting target speed information of the first head corresponding to the distance between the target track and the track which the first head is positioned over when the data processor receives the track pulse to control the speed of the first head, and for outputting track offset information for the first head to control the position of the first head, a servo control register for storing the target speed information and the offset information from the data processor, a digital to analog convertor for converting the digital information stored in the servo control register to analog signals, a signal selector for selectively outputting the speed signal, the position signal and the analog signal from the digital to analog converter, and a motor drive controller for outputting a motor drive conrol signal to the motor driving circuit in response to a selected signal from the signal selecter.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
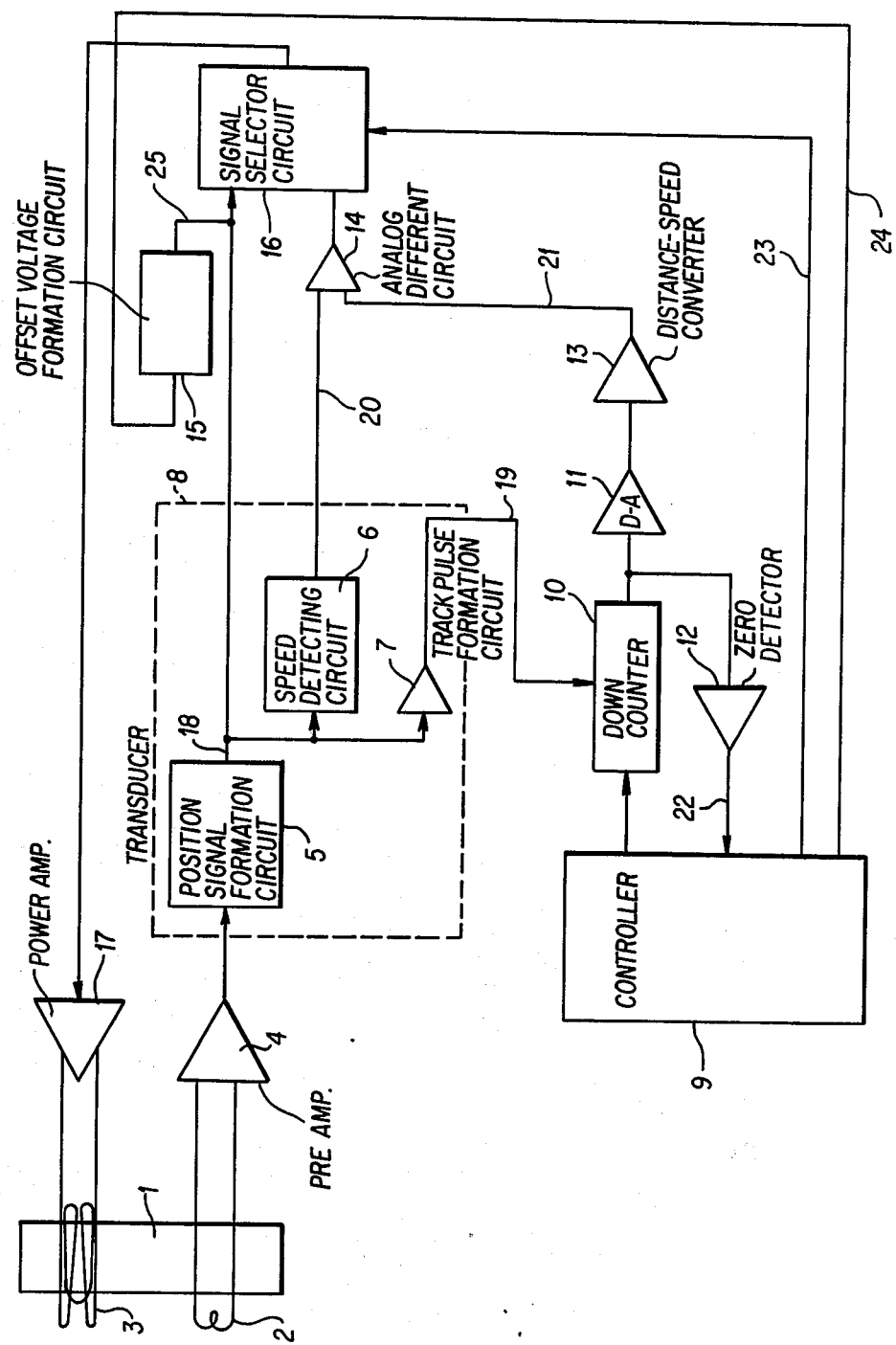
FIG. 1 is a block diagram of a magnetic disk apparatus of the prior art.
Figure 2:
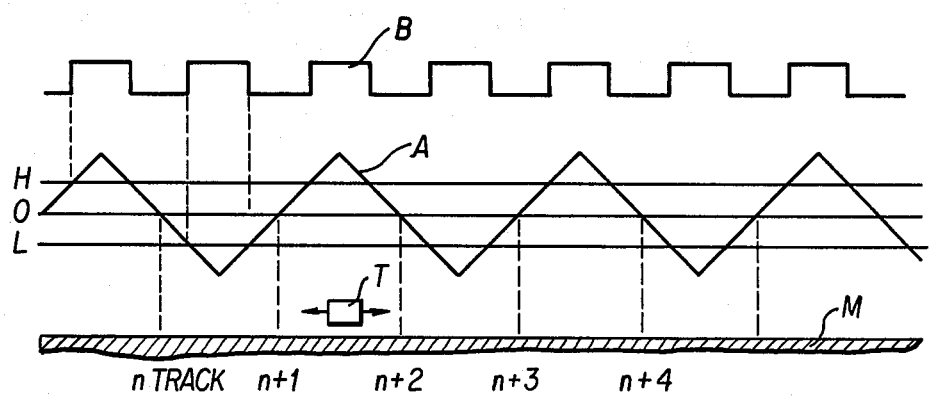
FIG. 2 is a timing chart for the magnetic disk apparatus of FIG. 1 explaining the relation between position signals and track pulses.

One embodiment of this invention will be explained hereinafter by first referring to FIG. 4. A carriage 40 is adapted to carry a servo head 42 and a read/write head (not shown) to read and/or write data . A voice coil motor 41, a pre-amplifier 44, and a transducer 45 comprised of a position signal formation circuit 46, track pulse formation circuit 47, and a speed detecting circuit 48 are also shown. A power amplifier 43 drives the voice coil motor 41. A data processor 49 is constructed of a microprocessor, a read only memory (ROM) storing control programs, a random access memory (RAM) for processing, and other registers. The track pulse formation circuit 47 is coupled to the microcomputer of the data processor 49 through a signal line 56, the track pulse acting as an interruption signal. A servo control register 50, a digital to analog (D-A) converter 51, and a signal selecter 52 formed with analog switches are also shown. The signal selecter 52, which may be implemented by means of the National Semiconductor Inc. LSI chip LF 13201, selectively outputs a signal based on predetermined combinations of the three signals 54, 55, and 59 as determined by the selecting signals 60, 61, and 62 from the data processor 49. A motor driving control circuit 53 serving as a pre-amp generates a motor driving control signal from the signal selected by the signal selecter 52 which is provided to the power amplifier 43 for the voice coil 41, driving the voice coil motor 41 with the motor driving control signal.

Figure 3:
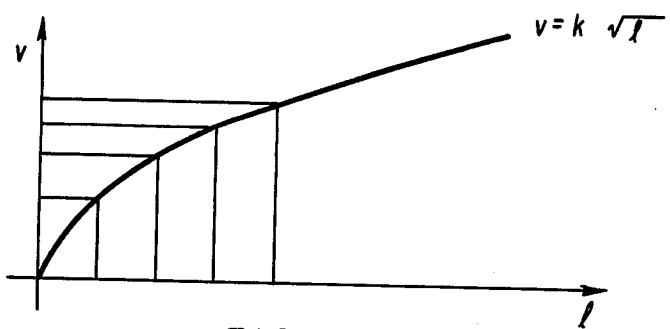
FIG. 3 is a graph of the function $v = k\sqrt{l}$ for the relationship between the distance l to a target track and target speed of the head.
Figure 5:
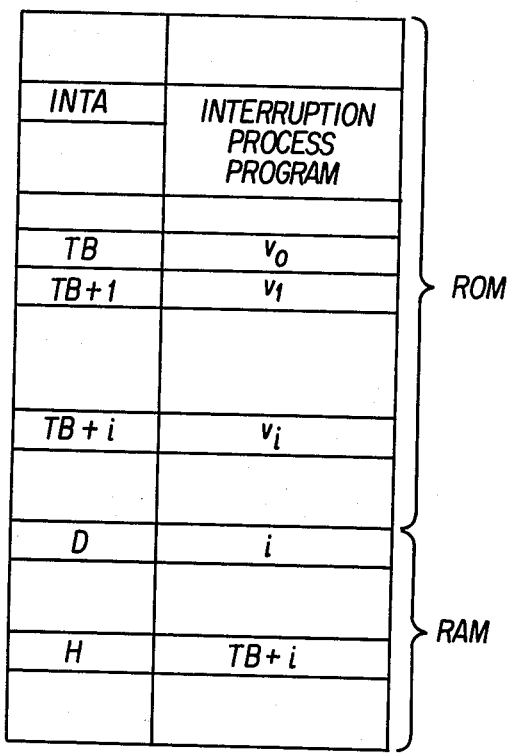
FIG. 5 is an illustration of the memory configuration for the data processing apparatus of FIG. 4.

In FIG. 5, the memory of the data processor is shown divided into RAM storage and ROM storage. The interruption processing programs are stored at the address INTA of the ROM. A distance speed converter table with addresses TB through TB+i of the ROM stores the respective digital values of the target speed v corresponding to the distance l, as explained in FIG. 3.

Figure 4:
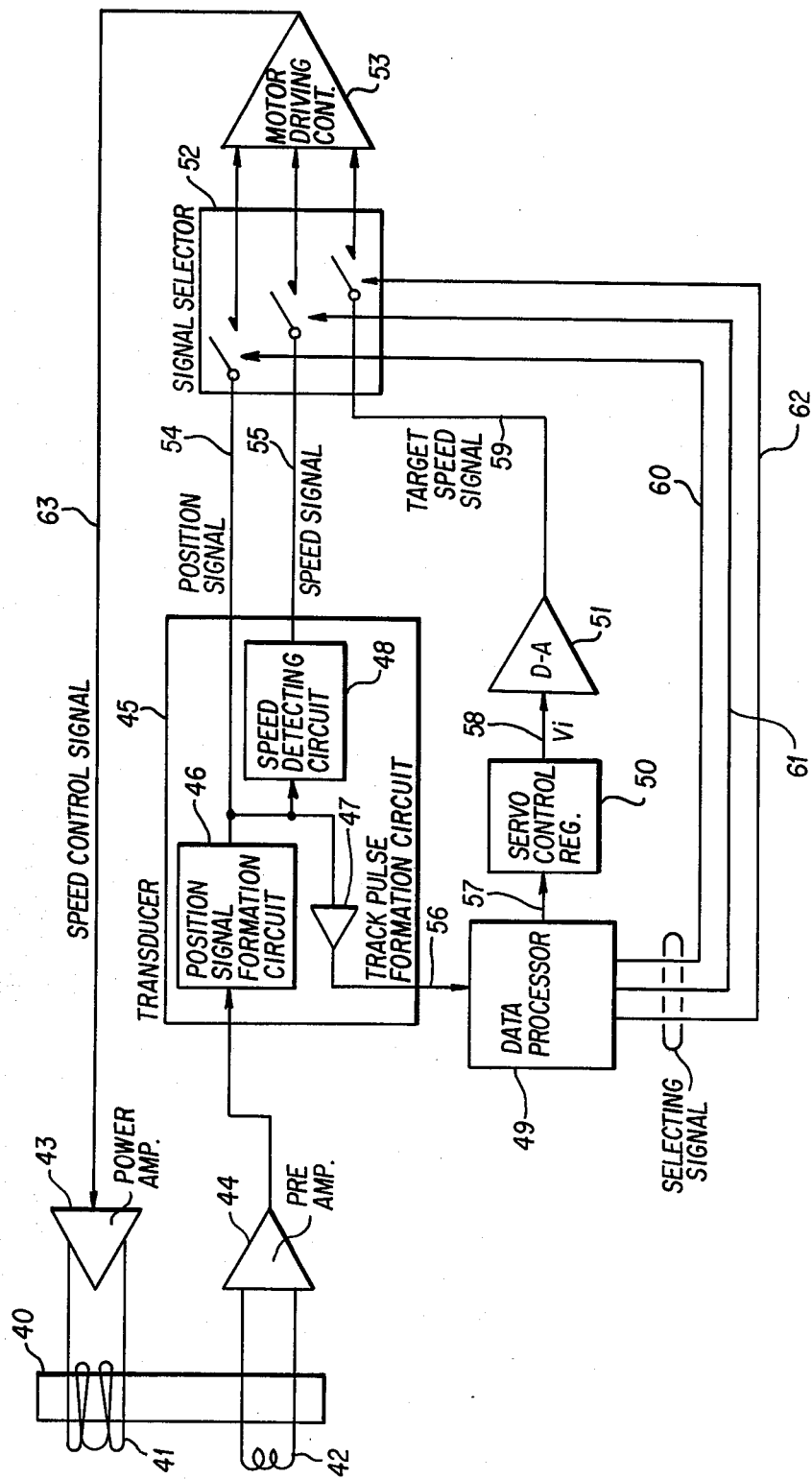
FIG. 4 is a block diagram of one embodiment of the disk control circuit for the magnetic disk apparatus of the present invention.
Figure 6A:
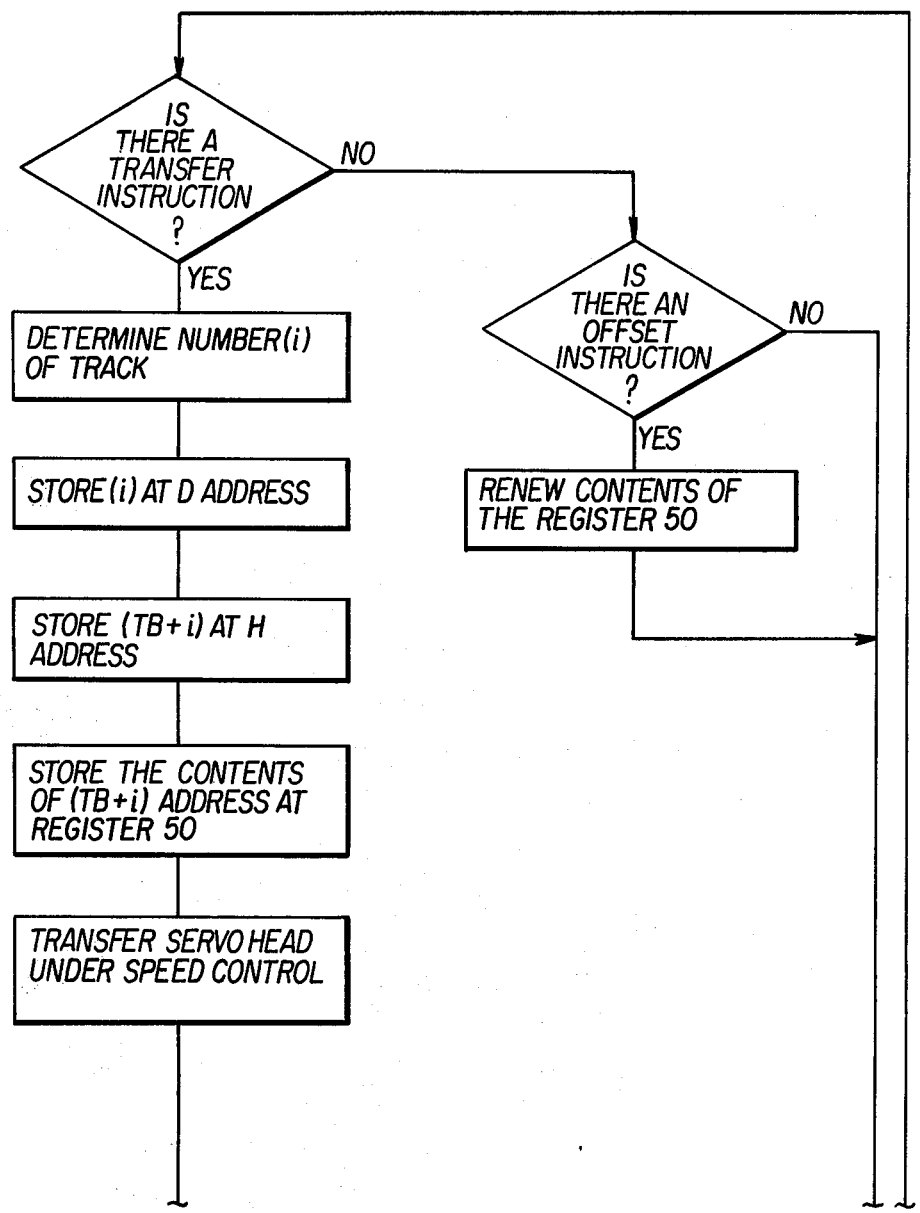
FIGS. 6a and 6b are flow charts to explain the operation of one embodiment of the present invention.
Figure 6B:
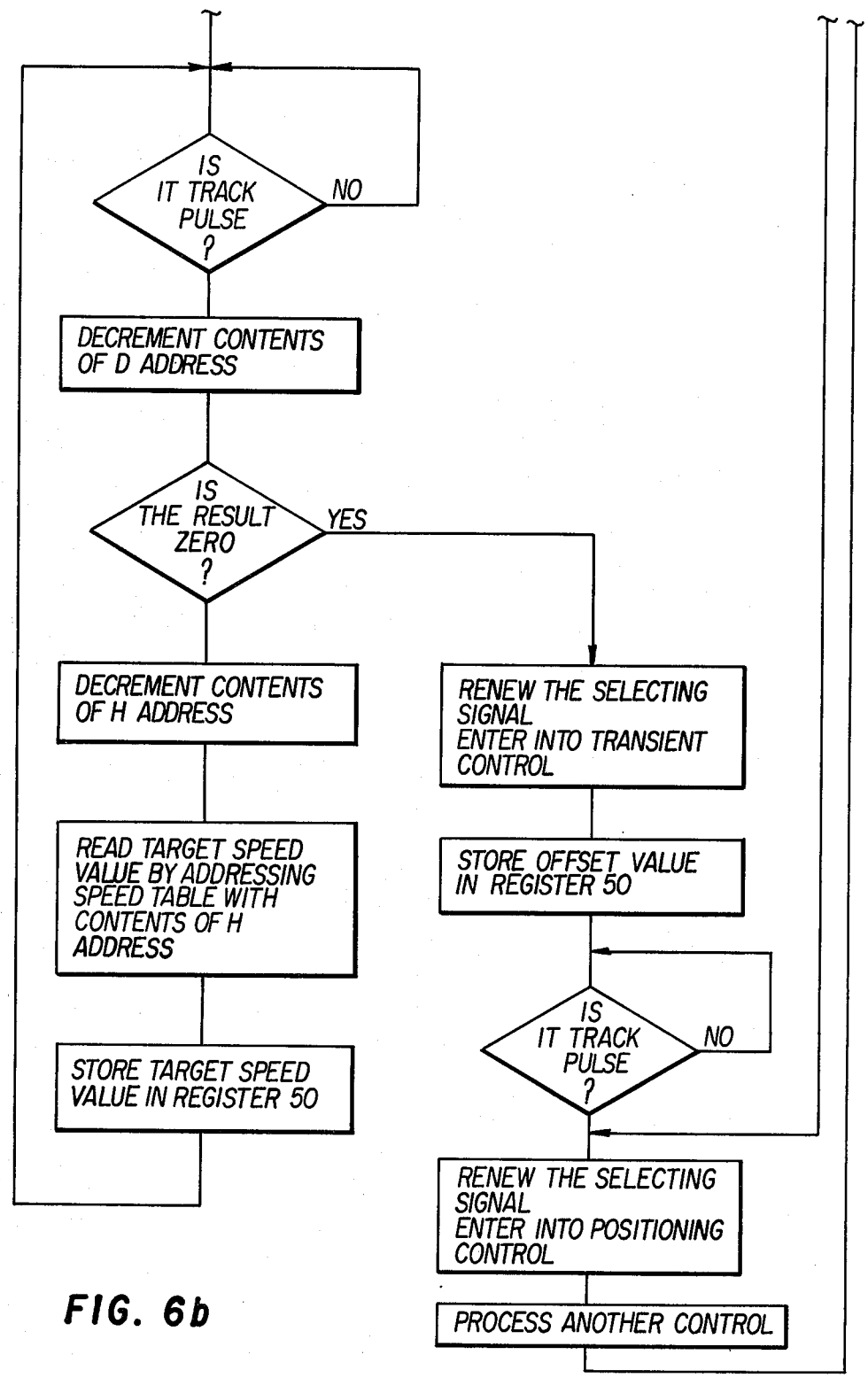

Nextly, explained are the operations of the embodiment by referring to FIG. 4, FIG. 5, and FIG. 6. If the data processor 49 receives an instruction to transfer the head from a magnetic disk control device (not shown), it calculates the number of tracks i from the track at which the servo head is presently positioned to the target cylinder, and stores the result at an address D of the RAM (see FIG. 5). Then the data processer 49 adds the number of tracks i to the baseaddress TB in the distance speed converter table, and stores the result at an address H of the RAM. At this time, i is the number of tracks the head must cross to transfer to the new position and the content TB+i at the address H indicates an address within the ROM at which the target speed value Vi, corresponding to the number of tracks i the head must travel, is stored. The data processer 49 reads out the target speed value Vi from the address TB+i of the ROM and then stores it in the servo control register 50. The servo control register 50 provides the D-A converter 51 with the target speed value Vi through the line 58 to convert the value into an analog signal, and the D-A convertor provides the signal selecter 52 through the line 59 with the analog singal representing the target speed signal. The data processer 49 nextly controls the signal selecter 52 to select the speed signal from the line 55 and the target speed signal of the head from the line 59 by providing second and third selecting signals through the lines 61 and 62, the position signal through the line 54 not having been selected. At the same time, the motor driving control circuit 53 forms the speed control signal for the head based on a combination of the speed signal from line 55 and the target speed signal from line 59. The motor driving control circuit provides the power amplifier 43 with the speed control signal through the line 63. The power amplifier 43 then drives the voice coil motor 41 in responding to the speed control signal to begin transfer of the carriage 40. When the carriage 40 begins transferring, and the servo head 42 crosses a track, the track pulse via the line 56 causes the microcomputer to start the interruption processing.

If the microcomputer receives the interruption signal, it reads the number of tracks i at the address D of the RAM, and then subtracts one from the number i so that it now stores the number i−1 at the address D. After that, the contents TB+i at the address H are read and then decremented by one and then stored as TB+i−1 again at the address H. The target speed signal is renewed by reading the new target speed corresponding to the new number of tracks i−1 at the address D by using the contents TB+i−1 of the RAM address H to address the ROM and to write the new target speed in the servo control register 50. As mentioned above, the microprocessor controls the speed of the carriage to renew the target speed of the head whenever the track pulse is output.

When the microcomputer renews the target speed such that the contents at the address D, that is the number of remaining tracks is 0, the data processor 49 transiently controls the signal selecter 52 to select only the speed signal from the line 55 by outputting the second selecting signal through the line 61. This transient control makes the speed of the head zero.

The data processor 49 next stores the track offset value in the servo control register 50 through the line 57. Then, after the data processor 49 detects that the track pulse which has provided the subtraction of one which causes the contents at the address D of the RAM to become zero, has fallen to a low level, it provided the signal selecter 52 with the first and third selecting signal through the lines 60 and 62. Therefore, the signal selecter 52 selects the position signal from the line 54 and a track offset signal analogous to the track offset value stored at the servo control register 50 through the line 59. The data processer controls the position of the head to stop just above the target track, by causing the motor driving control circuit 53 to output the position control signal to the power amplifier 43 through the line 63 to control the head to stop just above the target track as determined by the poistion signal and the track offset signal. If there is no necessity for the track offset, the line 59 would not be selected at the signal selector 52. It also is quite easy to change the track offset value to control the track offset, thereby changing the track offset value stored in the servo control register 50.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A disk control circuit for a magnetic disk apparatus comprising:
    a magnetic disk operably connected to said apparatus for storing data, including servo data on tracks;
    a carriage, operably connected to said apparatus for radial movement with respent to said magnetic disk;
    a first magnetic head operably connected to said carriage for reading data from and writing data to said magnetic disk;
    a second magnetic head, operably connected to said carriage, for reading said servo data;
    a motor operably connected to said carriage, for moving said carriage;
    motor driving circuit means, electrically connected to said motor, for driving said motor;
    convertor circuit means, electrically connected to said first head and said second head, for converting said servo data read out from said second head to a position signal to indicate the position of said first head with respect to said magnetic disk, to a speed signal to indicate the speed of said first head, and to a track pulse to indicate passing of said first head over a track of said magnetic disk;
    processing means, electrically connected to said converter circuit means, for generating target speed information, said target speed information corresponding to the distance between a target track and a track which said first head is positioned above whenever said data processor receives said track pulse, to control the speed of said first head, and for generating track offset information to control the position of said first head;
    a servo control register means, electrically connected to said processing means, for storing said track speed information and said track offset information from said processing means;
    a digital to analog convertor means, electrically connected to said servo control register means, for converting said track speed information and said track offset information from said servo control register means to analog signals;
    signal selecter means, electrically connected to said processing means, said convertor circuit means and said digital to analog convertor means, for selectively generating motor control signals based on predetermined combinations of said speed signal, said position signal and said analog signal from said digital to analog convertor; and
    a motor drive controller means, electrically connected to said signal selector means and said motor driving circuit means, for generating and coupling to said motor driving circuit means motor drive control signals in response to said motor control signals.

2. A magnetic disk apparatus according to claim 1 wherein said processing means is a microprocessor.

* * * * *